United States Patent [19]
Neister

[11] Patent Number: 5,777,437
[45] Date of Patent: Jul. 7, 1998

[54] ANNULAR CHAMBER FLASHLAMP INCLUDING A SURROUNDING, PACKED POWDER REFLECTIVE MATERIAL

[75] Inventor: S. Edward Neister, New Durham, N.H.

[73] Assignee: Lumenx Technologies Inc., New Durham, N.H.

[21] Appl. No.: 675,298

[22] Filed: Jul. 1, 1996

[51] Int. Cl.$^6$ .................... H01J 17/16; H01J 61/30
[52] U.S. Cl. .................. 313/635; 313/634; 313/113; 313/317
[58] Field of Search .................. 313/634, 635, 313/317, 318.11, 324, 22, 47, 17, 26, 27, 113, 619; 372/25, 72, 103; 220/2.1 R; 422/186.16, 186.2, 186.21, 186.22

[56] References Cited

U.S. PATENT DOCUMENTS

| | | | |
|---|---|---|---|
| 3,943,396 | 3/1976 | Kose et al. | 313/311 |
| 4,250,427 | 2/1981 | Neister | 313/217 |
| 4,325,006 | 4/1982 | Morton | 313/634 |
| 4,456,336 | 6/1984 | Chung et al. | 350/338 |
| 4,862,888 | 9/1989 | Yessik | 372/72 |

*Primary Examiner*—Sandra L. O'Shea
*Assistant Examiner*—Jay M. Patidar
*Attorney, Agent, or Firm*—Alfred J. Mangels

[57] ABSTRACT

A coaxial flashlamp for optical pumping of a tunable dye laser. The flashlamp includes electrodes preferably made from a tungsten-based alloy for reduced metallic vapor deposition within the flashlamp. Positioned around the outer tube is a packed powder material having a diffuse reflectivity of the order of at least about 98%. The outer surface of the outer tube is placed under an inwardly-directed pressure provided by a pressurized cooling liquid that serves both to cool the flashlamp and simultaneously to offset internally generated pressure within the flashlamp caused by the pressure wave resulting from the movement of the ionization front through the gas within the annular gas chamber defined between the inner and outer tubes.

17 Claims, 1 Drawing Sheet

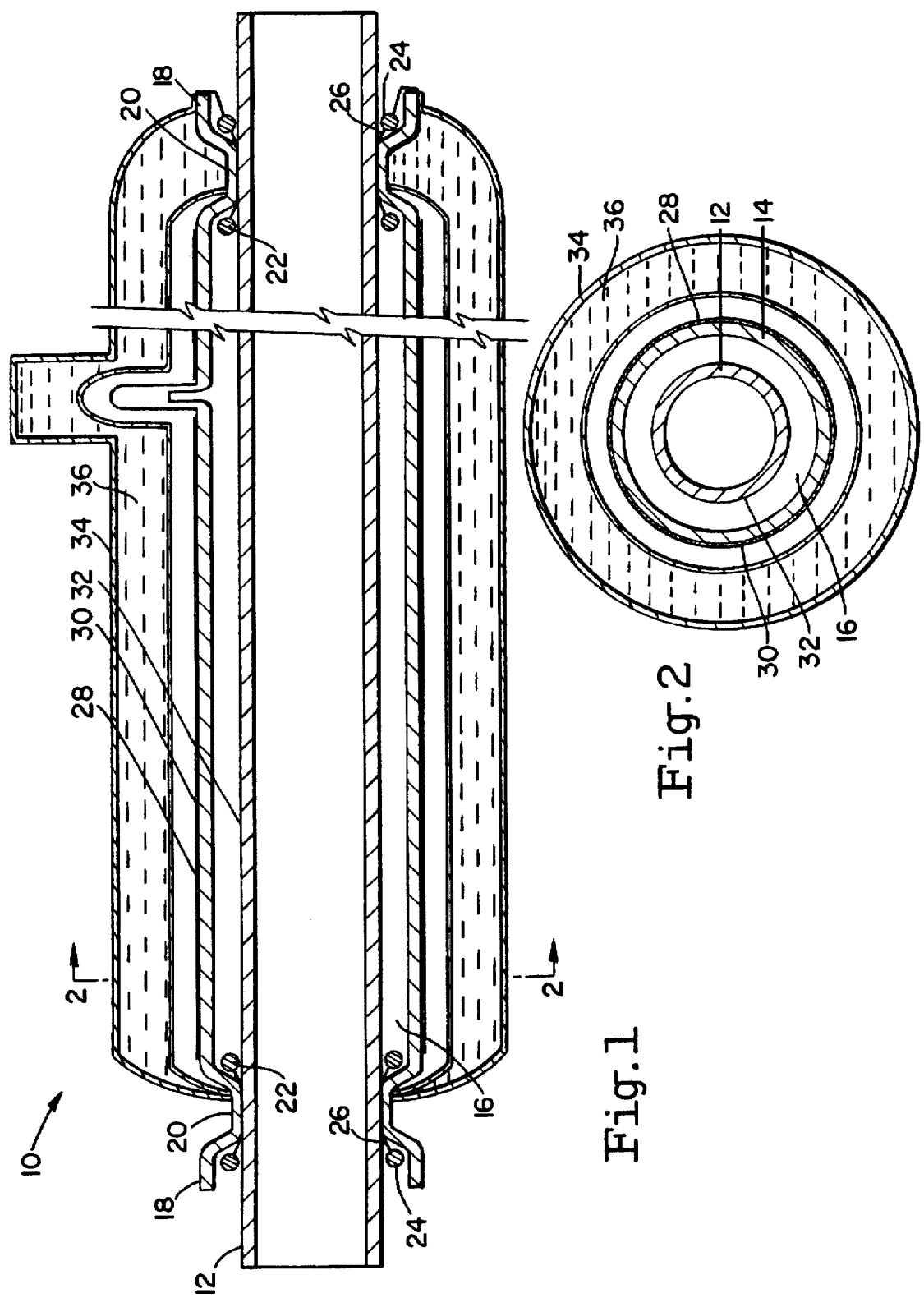

ANNULAR CHAMBER FLASHLAMP INCLUDING A SURROUNDING, PACKED POWDER REFLECTIVE MATERIAL

BACKGROUND OF THE INVENTION

1. Field of the Invention

The present invention relates to a flashlamp for use in an optically-pumped dye laser, and more particularly to a coaxial flashlamp structure having an inner dye cell and an annular gas chamber surrounding the inner dye cell, wherein the flashlamp provides improved operating efficiency, longer operating life, and improved reliability.

2. Description of the Related Art

Optically-pumped lasers utilize photons from a source of light to excite molecules of an organic dye carried in a liquid medium, to cause the dye to emit coherent light having a desired wavelength. The light source can be a flashlamp, which provides pulses of light energy to the dye material. One form of flashlamp that has been found suitable for use in such an optically-pumped laser is a coaxial flashlamp wherein an inner tubular dye cavity or cell is provided to receive the laser dye material. Surrounding the outer surface of the tubular dye cavity or cell is a flashtube defined by a coaxially positioned quartz or silica glass tube that has a greater diameter than that of the tubular dye cavity to define therewith a closed, annular flashtube of predetermined length. A suitable gas, such as xenon gas, is provided within the annular flashtube, and electrodes are positioned at each end of the annular flashtube so that an electrical current passes through the xenon gas to cause it to ionize and produce a large quantity of white light. A coaxial tube structure for one such type of flashlamp is disclosed in the present inventor's previously-issued U.S. Pat. No. 4,250,427, which issued on Feb. 10, 1981, and is entitled, "Dye Laser Flashlamp and Method of Making Same".

Although flashlamps having the structure disclosed in the present inventor's earlier patent are quite adequate for use in dye lasers, and, in fact, constitute a significant improvement in reliability and service life over previous such structures by virtue of the improved electrode arrangement and seal therein disclosed, further improvements in operating efficiency, in effective operating life, and in reliability are desirable.

It is an object of the present invention to provide an improved flashlamp structure for use in liquid tunable dye lasers, to provide improved operating efficiency, longer useful life, and improved reliability, to thereby enable the flashlamp to be more effectively utilized in medically directed laser devices.

SUMMARY OF THE INVENTION

Briefly stated, in accordance with one aspect of the present invention, a flashlamp is provided as a source of light excitation in a tunable dye laser. The flashlamp includes a pair of coaxially disposed inner and outer tubular members each having different diameters to define therebetween an annular gas chamber. The tubular members are fused together at a pair of longitudinally spaced positions to provide at each position a substantially gas-tight seal therebetween. A ring electrode is positioned at each axial end of the gas chamber, and a connector extends from each of the electrodes for connection of the electrodes with a source of electrical energy. A reflective material surrounds and is in contact with the outer tubular member and has a reflectivity of at least about 0.98.

In accordance with another aspect of the present invention the electrodes are made from a high density material to avoid sputtering of electrode material within the gas chamber.

In accordance with a further aspect of the present invention a cooling jacket is provided around the reflective material.

BRIEF DESCRIPTION OF THE DRAWINGS

FIG. 1 is a longitudinal cross-sectional view of a coaxial flashlamp in accordance with the present invention.

FIG. 2 is a transverse cross-sectional view of the flashlamp of FIG. 1, taken along the line 2—2 thereof.

DESCRIPTION OF THE PREFERRED EMBODIMENTS

Referring to the drawings, there is shown a flashlamp 10 that includes an inner quartz tube 12 and an outer quartz tube 14 that has a larger diameter than that of inner tube 12 and that surrounds and is coaxial with inner quartz tube 12. The inner diameter of outer tube 14 is greater than the outer diameter of inner tube 12 to define therebetween an annular gas chamber 16. Outer tube 14 has a shorter axial length than that of inner tube 12 and has opposite end portions 18 that each include a reduced diameter, annular, inwardly extending sealing ridge 20 that contacts and is sealed to the outer surface of inner tube 12 to define the ends of annular gas chamber 16.

Positioned interiorly of chamber 16 adjacent each end thereof is an inner electrode 22 in the form of an electrically conductive metallic ring to encircle inner tube 12. Positioned exteriorly of chamber 16 at each end thereof is an outer electrode 24, also in the form of an electrically conductive metallic ring that also encircles inner tube 12. Extending between each of inner electrodes 22 and its respective outer electrode 24 are a plurality of electrically conductive connector strips 26 that extend axially along the outer surface of inner tube 12. As taught in the present inventor's earlier U.S. Pat. No. 4,250,427, the disclosure of which is hereby incorporated herein by reference to the same extent as if fully rewritten, a number of connector strips 26 are equidistantly circumferentially spaced about the outer surface of inner tube 12, and they can advantageously be made from molybdenum. Preferably, sealing ridge 20 is heat fused to the outer surface of inner tube 12 to surround and hold those portions of each of connector strips 26 that pass through the seal area at sealing ridge 20 between inner tube 12 and outer tube 14, and simultaneously to close and seal the ends of chamber 16 to preclude the entry of outside air into chamber 16. Fusing the inner and outer tubes together also avoids the entry into chamber 16 of compounds given off by solvents that were contained in the adhesives formerly employed to seal the ends of the outer tube to the inner tube.

In the past, because of the degree of opacity of the gas within chamber 16 during the generation of short light pulses (i.e., those having a pulse duration of from about 0.5 to about 1 microsecond) within such an annular coaxial flashlamp, special reflectors were frequently not provided around the outer surface of the outer tube because part of the generated light that radiated outwardly from chamber 16 was blocked by the opacity of the plasma generated in the gas contained within chamber 16. When they were provided, such reflectors often were in the form of aluminum foil that was wrapped around the outside of the outer tube, and resulted in about a 10% addition to the laser pulse length. However, as the length of the desired laser pulse is further increased, the peak currents within chamber 16 are reduced, and it was found that the aluminum foil reflectors employed with short pulse flashlamps resulted in an inefficient flashlamp. For example, a standard aluminum foil wrap, which has a reflectance of the order of about 0.85 to about 0.88 resulted in a lamp that had an efficiency of production of laser light of less than about 0.05%. A lamp of such low efficiency is very sensitive to laser dye contamination and deterioration, each of the latter of which can cause a significant reduction in laser light output.

It has been found that providing a very highly reflective material around the entire outer surface of outer tube 14 can result in a substantial improvement in flashlamp output to the lasing dye material, and thereby increases the laser light output. Materials having reflectance values of the order of about 0.94 or more have been found particularly effective in improving laser light production efficiency to as much as about 0.25%, a five-fold improvement, for a pulse length of 450 microseconds. Such reflectance values, and the resulting improvement in lamp operating efficiencies, have been found to be obtainable by tightly packing a highly reflective material 28, such as barium sulfate powder, around and in direct and continuous contact with the outermost surface 30 of outer tube 14, to completely cover the outer tube. A packing pressure in excess of 100 psi., to provide a tightly packed barium sulfate outer layer having a density of about 1 to 4 gm/cc was found to give very good results. In addition to barium sulfate, other suitable materials that are expected to have high reflectance when tightly packed about the outer tube include titanium dioxide, alumina, manganese oxide, and the like.

To obtain longer laser pulse lengths requires that longer duration light pulses be generated in the flashlamp. Longer duration light pulses cause the flashlamp electrodes to become hotter, sometimes to the extent of overheating the electrode material to the point that the material from which inner electrode ring 22 is made begins to sputter away from the electrode surface and to condense on the clear fused silica glass defining gas chamber 16. As the outer surface 32 of inner tube 12 becomes coated with deposited electrode material, the transparency of inner tube 12 diminishes, thereby restricting the quantity of flashlamp light that can reach the lasing dye material within inner tube 12. And after a number of shots of the flashlamp the extent of deposition of electrode material on the flashlamp inner surfaces can reach a point that lasing efficiency is so reduced that replacement of the flashlamp is required. Consequently, instead of the usual nickel electrodes utilized in previous coaxial flashlamps, it has been found that electrodes made from a high density alloy dramatically improve the flashlamp life. Tungsten alloys are suitable because such materials have a relatively high density, of the order of at least about 16 gm/cc, and electrodes formed from such high density materials are less prone to sputtering at the electrode temperatures common when providing laser output pulses of the order of about 400 microseconds. The electrodes can preferably be formed from a high density refractory metal alloy consisting essentially by weight of from about 80% to about 98% tungsten, from about 2% to about 8% nickel, and from about 1% to about 4% copper. Alternatively, the copper can be replaced with about 1% to about 4% iron, and up to about 5% molybdenum can be added.

One tungsten-based alloy that has been found to be effective as an electrode material for such applications is alloy CMW 1000, which is available from CMW Inc., of Indianapolis, Ind., and which has a density of 16.96 gm/cc and which consists, by weight, of 90% tungsten, 6% nickel, and 4% copper. Other high density refractory metal alloys that are believed to be suitable include CMW 2000, CMW 3950, and Anviloy 1150, each of which is also available from CMW Inc., of Indianapolis, Ind.

In the operation of a flashlamp in accordance with the lamp is typically energized by discharging a charged capacitor connected with the electrodes, to provide the electrical energy to cause ionization of the gas within chamber 16. Generally that gas is xenon. During the initial discharge of electrical energy, the gas around one of the electrodes is ionized, and an ionization wave front is formed that progresses longitudinally through the gas within chamber 16 toward the opposite electrode. Movement of the ionization wave front produces a pressure wave that also travels longitudinally within chamber 16, and because chamber 16 is a closed cavity, the pressure wave causes an inwardly-directed pressure to be imposed on inner tube 12 and an outwardly-directed pressure to be imposed on outer tube 14, thereby generating a hoop stress within the wall of outer tube 14.

Fused silica glass tubing, which is the commonly employed material from which the inner and outer tubes are made, can withstand a significant compressive stress, which is the type of loading imposed on inner tube 12 by the pressure wave. However, such tubing cannot withstand a large tensile stress, which is the type of loading imposed on outer tube 14 by the pressure wave. And for laser pulse lengths of the order of about 450 microseconds, which is the preferred laser pulse length for several types of medical treatments using laser light, failure of the flashlamp can be expected to occur because of the high pressure forces imposed on outer tube 14. Accordingly, positioned around the outer surface of the packed barium sulfate powder is an outer metallic casing 34 that defines an annular enclosing pressure cell 36 for receiving a pressurized liquid, such as water or the like, to maintain an inwardly-directed pressure on outer tube 14, to, in effect, preload outer tube 14 with a compressive stress, thereby to offset the effect on outer tube 14 of the pressure wave that is generated during illumination of the flashlamp. Preferably, the pressure under which the liquid is maintained is of the order of about 40 psi. or greater, to maintain a positive inward pressure on outer tube 14 during the entire operating cycle of the flashlamp.

In addition to providing a compensating inward pressure on outer tube 14, the provision of a cooler, circulating, pressurized liquid within outer casing 34, through suitable inlet and outlet connections, also serves to cool the flashlamp and extend its effective operating life. Because of the buildup of heat that results from operation of the flashlamp, some amount of cooling is desirable to maintain the fused silica glass at a temperature below which devitrification or other breakdown of the glass structure can occur. Additionally, it is also desirable to maintain the ends of outer tube 14, adjacent the electrodes and the metal to glass seals, at a temperature sufficiently low to minimize electrode temperature and stresses at the joints that could cause leakage of the flashlamp gas or that could permit the entry of outside air into the interior of the flashlamp.

Incorporation of each of the above-described improvements in the structure of a coaxial flashlamp for a tunable dye laser can be expected both to significantly lengthen the effective operating life and also to improve the operating efficiency of the flashlamp.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A flashlamp for providing a source of light excitation in a tunable dye laser, said flashlamp comprising:
    a. a pair of coaxially disposed inner and outer tubular members each having different diameters to define therebetween an annular gas chamber, wherein the tubular members are fused together at a pair of longitudinally spaced positions to provide at each position a substantially gas-tight seal therebetween, a ring electrode positioned at each axial end of the gas chamber, and a connector extending from each of the electrodes for connection of the electrodes with a source of electrical energy;
    b. a reflective material surrounding and in contact with the outer tubular member, the reflective material providing diffuse reflectivity and having a reflectivity of at least about 0.98, wherein the reflective material is a packed powder.

2. A flashlamp in accordance with claim 1 wherein the packed powder is barium sulfate.

3. A flashlamp in accordance with claim 2 wherein the packed powder has a density of about 1 gm/cc to about 4 gm/cc.

4. A flashlamp in accordance with claim 3 wherein the powder is packed under a pressure sufficient to provide the desired packing density.

5. A flashlamp in accordance with claim 2 including a cooling-liquid jacket surrounding the reflective material overlying the outer tube.

6. A flashlamp in accordance with claim 2 wherein the electrodes are formed from an alloy consisting essentially by weight of from about 80% to about 98% tungsten, from about 2% to about 8% nickel, and from about 1% to about 4% copper.

7. A flashlamp in accordance with claim 2 wherein the electrodes are formed from an alloy consisting essentially by weight of from about 80% to about 98% tungsten, from about 2% to about 8% nickel, from about 1% to about 4% iron, and up to about 5% molybdenum.

8. A flashlamp in accordance with claim 1 wherein the electrodes are formed from an alloy consisting essentially by weight of from about 80% to about 98% tungsten, from about 2% to about 8% nickel, and from about 1% to about 4% copper.

9. A flashlamp in accordance with claim 8 wherein the alloy consists essentially of about 90% tungsten, about 6% nickel, and about 4% copper.

10. A flashlamp in accordance with claim 1 including a cooling-liquid jacket surrounding the reflective material overlying the outer tube.

11. A flashlamp in accordance with claim 10 wherein the cooling-liquid jacket defines a closed cavity about and in contact with the outer tube for receiving a pressurized cooling liquid.

12. A flashlamp in accordance with claim 11 wherein the cooling liquid within the cooling liquid jacket is pressurized to a pressure greater than a pressure generated within the annular chamber upon discharge of the flashlamp.

13. A flashlamp in accordance with claim 11 wherein the electrodes consist essentially of about 90% tungsten, about 6% nickel, and about 4% copper.

14. A flashlamp in accordance with claim 12 wherein the pressure of the cooling liquid within the cooling-liquid jacket is greater than about 40 psig.

15. A flashlamp in accordance with claim 10 wherein the electrodes are formed from an alloy consisting essentially by weight of from about 80% to about 98% tungsten, from about 2% to about 8% nickel, and from about 1% to about 4% copper.

16. A flashlamp in accordance with claim 1 wherein the electrodes are formed from an alloy consisting essentially by weight of from about 80% to about 98% tungsten, from about 2% to about 8% nickel, from about 1% to about 4% iron, and up to about 5% molybdenum.

17. A flashlamp in accordance with claim 10 wherein the electrodes are formed from an alloy consisting essentially by weight of from about 80% to about 98% tungsten, from about 2% to about 8% nickel, from about 1% to about 4% iron, and up to about 5% molybdenum.

* * * * *